United States Patent
Luo et al.

(10) Patent No.: US 9,793,736 B2
(45) Date of Patent: Oct. 17, 2017

(54) FAST CHARGING METHOD FOR BATTERY

(71) Applicant: Dongguan Amperex Technology Limited, Dongguan (CN)

(72) Inventors: Fuping Luo, Dongguan (CN); Yu Luo, Dongguan (CN); Shengwei Wang, Dongguan (CN); Chao Gao, Dongguan (CN); Qiang Zheng, Dongguan (CN)

(73) Assignee: Dongguan Amperex Technology Limited, Guangdong Province (CN)

( * ) Notice: Subject to any disclaimer, the term of this patent is extended or adjusted under 35 U.S.C. 154(b) by 153 days.

(21) Appl. No.: 14/810,305

(22) Filed: Jul. 27, 2015

(65) Prior Publication Data

US 2016/0111898 A1    Apr. 21, 2016

(30) Foreign Application Priority Data

Oct. 17, 2014   (CN) .......................... 2014 1 0553510

(51) Int. Cl.
 *H02J 7/04* (2006.01)
 *H02J 7/16* (2006.01)
 *H02J 7/00* (2006.01)

(52) U.S. Cl.
 CPC ................. *H02J 7/0093* (2013.01)

(58) Field of Classification Search
 CPC ....... H02J 7/0083; H02J 7/245; H02J 13/0024
 (Continued)

(56) References Cited

U.S. PATENT DOCUMENTS

| 8,638,070 B2 * | 1/2014 | Maluf | ................. | H02J 7/0052 320/141 |
| 2007/0188134 A1 * | 8/2007 | Hussain | ............... | H01M 10/44 320/114 |

(Continued)

FOREIGN PATENT DOCUMENTS

| CN | 1269616 | 10/2000 |
| CN | 101809805 A | 8/2010 |

(Continued)

OTHER PUBLICATIONS

Office action from Japanese Patent Application No. 2015-134216 dated Aug. 9, 2016 and its English translation from Japanese Patent Office.

(Continued)

*Primary Examiner* — Edward Tso
*Assistant Examiner* — Ahmed Omar
(74) *Attorney, Agent, or Firm* — Ladas & Parry, LLP

(57) ABSTRACT

The present invention provides a fast charging method for battery, including the steps as follows: (1) the battery is charged with a constant current $I_1$ and the charging time is $t_1$; (2) the battery is charged with a constant current $I_2$ and the charging time is $t_2$; (3) the battery is discharged with the constant current $I_2$ and the discharging time is $t_3$, recycling until the voltage reaches a pre-charging voltage of battery; (4) the battery is standed after the voltage reaching the pre-charging voltage of battery, and the rest time is $t_4$, and then the battery is charged with a constant current $I_3$ until the voltage reaching a cut-off voltage of battery, and then the battery is charged with a constant voltage until the current reaching a cut-off current $I_4$; wherein, $I_2<I_1$, $t_2<t_1$, $t_3<t_1$, $I_2<I_3\leq I_1$, $I_4\leq I_2$. The fast charging method provided in present invention can decrease the polarization in pulse charging phase, increase the time of whole pulse charging phase, (Continued)

improve the charging speed in pulse charging phase, and thus shorten the full-charging time.

10 Claims, 2 Drawing Sheets

(58) Field of Classification Search
   USPC .......................................... 320/160, 129, 130
   See application file for complete search history.

(56) References Cited

U.S. PATENT DOCUMENTS

2010/0207583 A1   8/2010   Tanaka
2013/0026976 A1   1/2013   Lu

FOREIGN PATENT DOCUMENTS

| CN | 102820487 | 12/2012 |
| JP | 2011-024395 | 2/2011 |
| JP | 2014-068527 | 4/2014 |
| KR | 10-2011-0022556 A | 3/2011 |
| KR | 10-2011-0024707 A | 3/2011 |

OTHER PUBLICATIONS

Office action from Korean Patent Application No. 10-2015-01144393 dated Jul. 18, 2016 and its English translation from Korean Patent Office.

* cited by examiner

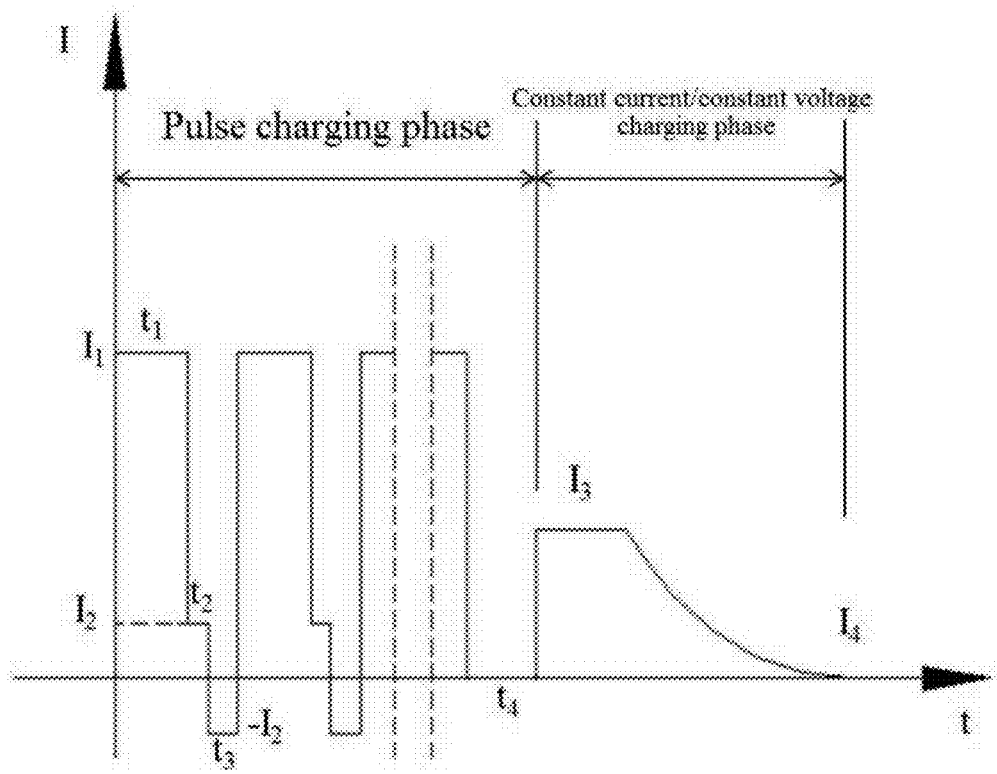
Figure 1 (Abstract figure)
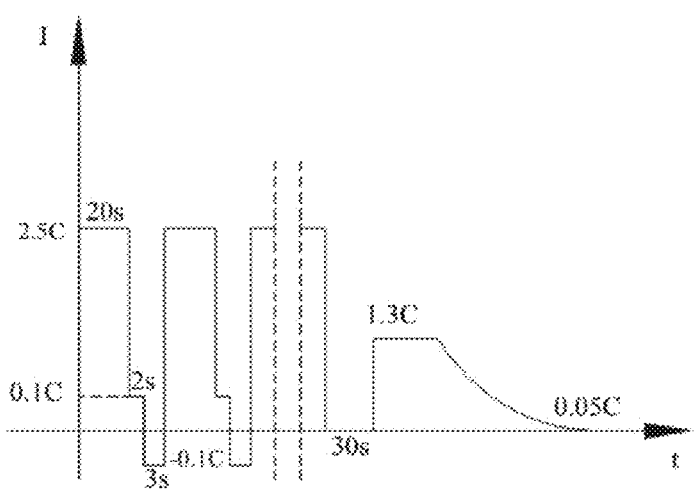
Figure 2

FAST CHARGING METHOD FOR BATTERY

CROSS-REFERENCE TO RELATED APPLICATION(S)

This application claims the priority to Chinese Patent Application No. 201410553510.1, filed on Oct. 17, 2014 in the Chinese Intellectual Property Office, the disclosure of which is incorporated in its entirety herein by reference.

TECHNICAL FIELD

The present invention relates to the field of battery, and particularly relates to a fast charging method for battery.

BACKGROUND

After 20 years of development, the energy density of the lithium-ion battery has been promoted greatly, but now the promotion of energy density runs into the bottleneck. The acceleration of the battery charging speed in limited energy density can effectively improve user experience. Hence, the fast charge lithium-ion battery with high energy density will stand out from the future competition.

On the premise of holding high energy density, to improve the charging speed of lithium-ion battery, lithium-battery researchers have done a lot work by changing electrode active material and current collector, and optimizing electrolyte component. These works have improved the battery fast charge performance greatly. But along with the improvement, the cost of battery raises and the related technology becomes more complex. On the basis of unchanging the ingredients and the structure, the performance of lithium battery can be optimized by adjusting the charged conditions.

The present charging method is that the battery is charged continuously with a constant current to a certain potential, and then the battery is charged with constant voltage at the certain potential. This method will make the cathode potential constantly increasing and the anode potential constantly decreasing. When the anode potential is lower than 0V, lithium ion will be reduced to lithium metal, liberated at the anode surface. Especially at low temperature, due to the decrease of the ion conductivity and the electron conductivity of lithium battery, the polarization degree will increase in charging process. The sustained charging method will make the polarization phenomenon more obvious, increasing the probability of the liberation of lithium. And the accumulation of lithium dendritic crystal on the electrode surface will pose a big threat to the safety performance of battery.

DISCLOSURE

In view of the problems mentioned in background, the present invention aims to provide a fast charging method for battery, which can improve the charging safety performance of batteries.

Another object of the present invention is to provide a fast charging method for battery, which can improve the charging speed of batteries.

In order to achieve above objects, the present invention provides a fast charging method for battery, including the steps as follows: (1) the battery is charged with a constant current $I_1$ and the charging time is $t_1$; (2) the battery is charged with a constant current $I_2$ and the charging time is $t_2$; (3) the battery is discharged with the constant current $I_2$ and the discharging time is $t_3$, recycling until the voltage reaches a pre-charging voltage of battery; (4) the battery is standed after the voltage reaching the pre-charging voltage, and the rest time is $t_4$, and then the battery is charged with a constant current $I_3$ until the voltage reaching a cut-off voltage of battery, and then the battery is charged with a constant voltage until the current reaching a cut-off current $I_4$; wherein, $I_2<I_1$, $t_2<t_1$, $t_3<t_1$, $I_2<I_3\leq I_1$, $I_4\leq I_2$.

The benefits of the present invention include:

The charging method provided in the present invention employs a heavy-current pulse with a wide range and a trickle current pulse with a narrow range, which can decrease the polarization brought by large pulse current charging. Then a trickle current pulse with a narrow range is employed in discharging process to further eliminate the polarization. Thus it greatly eliminates the problems of battery polarization, decreases the concentration of lithium ion on the anode surface, avoids the liberation of lithium at the anode, and then avoids the safety problems caused by the liberation of lithium, resulting in the improvement of the safety battery performance. Meanwhile, the fast charging method provided in the present invention can decrease the polarization in pulse charging phase, increase the time of whole pulse charging phase, shorten the full-charging time, and thus improve the charging speed in pulse charging phase greatly (early period of charging process).

DESCRIPTION OF THE DRAWING

FIG. 1 is the process illustration of the fast charging method for battery provided in the present invention.

FIG. 2 is the process illustration of the fast charging method for battery provided in Example 1 of the present invention.

EXAMPLES

Figure 3:
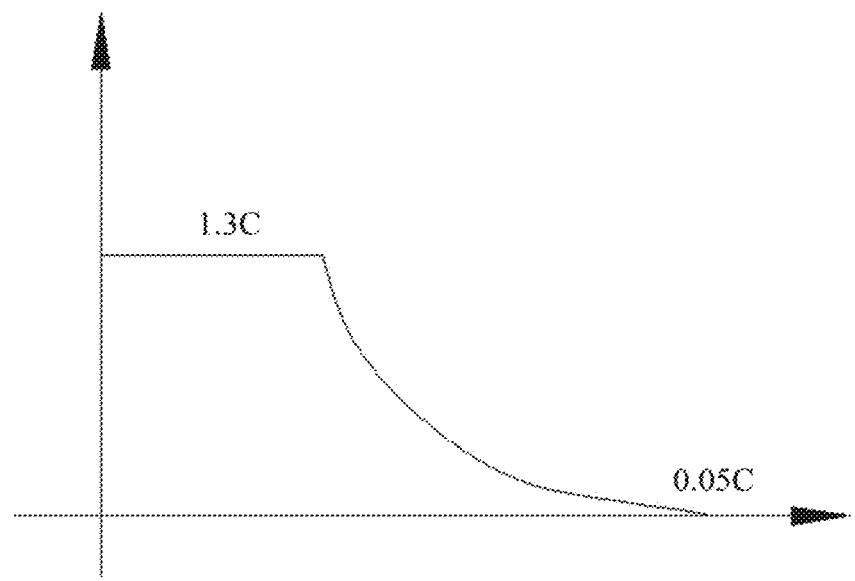
FIG. 3 is the process illustration of the fast charging method for battery provided in Comparative Example of the present invention.

The charging method provided in the present invention is illustrated in details, referring to the Figures.

Referring to FIG. 1, the fast charging method for battery according to the present invention includes the steps as follows: (1) the battery is charged with a constant current $I_1$ and the charging time is $t_1$; (2) the battery is charged with a constant current $I_2$ and the charging time is $t_2$; (3) the battery is discharged with the constant current $I_2$ and the discharging time is $t_3$, recycling until the voltage reaches a pre-charging voltage of battery; (4) the battery is standed after the voltage reaching the pre-charging voltage of battery, and the rest time is $t_4$, and then the battery is charged with a constant current $I_3$ until the voltage reaching a cut-off voltage of battery, and then the battery is charged with a constant voltage until the current reaching a cut-off current $I_4$; wherein, $I_2<I_1$, $t_2<t_1$, $t_3<t_1$, $I_2<I_3\leq I_1$, $I_4\leq I_2$.

In the fast charging method for battery provided in the present invention, pulse charge with heavy-current ($I_1$) (in step (1)) is benefit for shortening the charging time, and pulse charge with trickle current ($I_2$) (in step (2)) reduces the speed of lithium ion to the anode surface, which can decrease the generation of polarization, and provides a certain buffer time for lithium ion diffusing from the anode surface to the anode inside. The charging method provided in the present invention employs a heavy-current ($I_1$) pulse with a wide range ($t_1$) (in step (1)) and a trickle current ($I_2$) pulse with a narrow range ($t_2$) (in step (2)), which can decrease the polarization brought by large pulse current charging. Then a trickle current ($I_2$) pulse with a narrow range ($t_3$) (in step (3)) is employed in discharging process to further eliminate the polarization. Thus it greatly eliminates the problems of battery polarization, decreases the concentration of lithium ion on the anode surface, avoids the liberation of lithium at the anode, and then avoids the safety problems caused by the liberation of lithium, resulting in the improvement of the safety battery performance. Meanwhile, the fast charging method provided in the present invention can decrease the polarization in pulse charging phase, increase the time of whole pulse charging phase, improve the charging speed in pulse charging phase greatly (early period of charging process), and thus shorten the full-charging time.

In the fast charging method for battery provided in the present invention, said fast charging method for battery is performed at room temperature.

In the fast charging method for battery provided in the present invention, the current value of $I_1$ is at a range from 2.5 C to 3 C, and the charging time $t_1$ is at a range from 10 s to 30 s; the current value of 12 is at a range from 0.02 C to 0.2 C, and the charging time $t_2$ is at a range from 1 s to 10 s; the current value ratio of $I_1/I_2$ is at a range from 12.5 to 125, and the ratio of $t_1/t_2$ is at a range from 2 to 10. The current value of 12 is less than the current value of $I_1$, retarding the polarization generated by charging with the current $I_1$, and the charging time $t_2$ is less than the charging time $t_1$, avoiding the negative influence on the charging speed induced by charging too long with the trickle current.

In the fast charging method for battery provided in the present invention, in the step (3), the discharging time $t_3$ is at a range from 1 s to 10 s, and the ratio of $t_1/t_3$ is at a range from 3 to 10. The discharging time $t_3$ is at a range from 1 s to 10 s, which can further decrease the concentration of lithium ion on the anode surface. The long discharge time will influence the whole charging speed, while the short discharge time cannot eliminate the polarization.

In the fast charging method for battery provided in the present invention, in the step (4), the rest time $t_4$ is at a range from 10 s to 60 s, and the current value of $I_3$ is at a range from 1 C to 3 C, and the current value of 14 is at a range from 0.01 C to 0.1 C. The rest time $t_4$ is at a range from 10 s to 60 s, which can reduce the polarization brought by pulse charge, benefit for the follow-up charging step with constant current. The current value of 13 is at a range from 1.C to 3.C, which meets the needs of various batteries and is adaptable to different range of values.

In the fast charging method for battery provided in the present invention, in the step (3), the pre-charging voltage is at a range from $V_0$ to $V_k$; wherein, $V_0$ is the critical voltage value of battery, and $V_k$ is the voltage setting value lower than the critical voltage value to avoid the liberation of lithium at the anode. $V_k$ is set based on avoiding the liberation of lithium at the anode induced by too low potential, due to the great polarization brought by pulse charging phase.

In the fast charging method for battery provided in the present invention, $4.2 \leq V_0 < 4.5V$; $0 < V_k \leq 0.05V$. It should be pointed out that $V_k$ cannot be set too high, and if $V_k$ is set too high, pre-charging voltage in pulse charging phase will be decreased, thus reducing the technical effects of the present invention.

In the fast charging method for battery provided in the present invention, in the step (4), the cut-off voltage may be $V_0$.

In the fast charging method for battery provided in the present invention, in one embodiment, the pre-charging voltage is 4.34V, and the cut-off voltage is 4.35V.

In the fast charging method for battery provided in the present invention, said battery is lithium-ion battery, lead-acid battery, nickel-hydrogen battery or nickel-cadmium battery.

The Examples using the fast charging method for battery provided in the present invention, Comparative Example, testing method and testing results are shown below.

Example 1

The battery was prepared by the technology of assembling a cathode, an anode, a separator, an electrolyte and a packaging shell, and then dealing with a formation process, an aging process and the like. The cathode was produced by coating a conductive film on surface of 12 µm aluminum foil (used as a conductive collector), and the conductive film contained 96.7 wt % $LiCoO_2$, 1.7 wt % PVDF (used as a binder) and 1.6 wt % SP (used as a conductive additive). The anode was produced by coating a conductive film on surface of 8 µm copper foil (used as a conductive collector), and the conductive film contained 98% artificial graphite, 1.0% SBR (used as binder) and 1.0% CMC (used as thickening agent). The separator was a composite membrane of PP/PE/PP. The electrolyte was consisted of an organic solvent (30% EC+30% PC+40% DEC), $LiPF_6$ and an additive (0.5 wt % VC+5 wt % FEC+4 wt % VEC), in which the concentration of $LiPF_6$ was 1 mol/L.

All above-mentioned percentages were mass percent. At 25° C., the charging capacity of battery to fully charge (SOC) was 1700 mAh (0.2 C), and the cut-off voltage $V_0$ was 4.35V. At 25° C., the battery was charged with the fast charging method of the present invention, according to the steps as follows (see FIG. 2):
1) the battery was charged with constant current of 2.5 C, and the charging time was 20 s;
2) the battery was charged with constant current of 0.1 C, and the charging time was 2 s;
3) the battery was discharged with constant current of 0.1 C, and the discharging time was 3 s, recycling until the voltage reached the pre-charging voltage of battery of 4.34V;
4) the battery was standed after the voltage reaching the pre-charging voltage of battery of 4.34V, and the rest time was 30 s, and then the battery was charged with constant current of 1.3 C until the voltage reaching a cut-off voltage of battery of 4.35V, and then the battery was charged with constant voltage until the current reaching the cut-off current of 0.05 C.

Example 2

The battery was the same as Example 1.
At 25° C., the battery was charged with the fast charging method of the present invention, according to the steps as follows:
1) the battery was charged with constant current of 3 C, and the charging time was 20 s;
2) the battery was charged with constant current of 0.05 C, and the charging time was 2 s;
3) the battery was discharged with constant current of 0.05 C, and the discharging time was 3 s, recycling until the voltage reached the pre-charging voltage of battery of 4.34V;

4) the battery was standed after the voltage reaching the pre-charging voltage of battery of 4.34V, and the rest time was 30 s, and then the battery was charged with constant current of 1.3 C until the voltage reaching a cut-off voltage of battery of 4.35V, and then the battery was charged with constant voltage until the current reaching the cut-off current of 0.05 C.

Example 3

The battery was the same as Example 1.
At 25° C., the battery was charged with the fast charging method of the present invention, according to the steps as follows:
1) the battery was charged with constant current of 2.5 C, and the charging time was 30 s;
2) the battery was charged with constant current of 0.1 C, and the charging time was 5 s;
3) the battery was discharged with constant current of 0.1 C, and the discharging time was 10 s, recycling until the voltage reached the pre-charging voltage of battery of 4.34V;
4) the battery was standed after the voltage reaching the pre-charging voltage of battery of 4.34V, and the rest time was 10 s, and then the battery was charged with constant current of 1.3 C until the voltage reaching a cut-off voltage of battery of 4.35V, and then the battery was charged with constant voltage until the current reaching the cut-off current of 0.05 C.

Example 4

The battery was the same as Example 1.
At 25° C., the battery was charged with the fast charging method of the present invention, according to the steps as follows:
1) the battery was charged with constant current of 2.5 C, and the charging time was 20 s;
2) the battery was charged with constant current of 0.02 C, and the charging time was 2 s;
3) the battery was discharged with constant current of 0.02 C, and the discharging time was 3 s, recycling until the voltage reached the pre-charging voltage of battery of 4.34V;
4) the battery was standed after the voltage reaching the pre-charging voltage of battery of 4.34V, and the rest time was 20 s, and then the battery was charged with constant current of 1.3 C until the voltage reaching a cut-off voltage of battery of 4.35V, and then the battery was charged with constant voltage until the current reaching the cut-off current of 0.1 C.

Example 5

The battery was the same as Example 1.
At 25° C., the battery was charged with the fast charging method of the present invention, according to the steps as follows:
1) the battery was charged with constant current of 2.5 C, and the charging time was 10 s;
2) the battery was charged with constant current of 0.2 C, and the charging time was 2 s;
3) the battery was discharged with constant current of 0.2 C, and the discharging time was 1 s, recycling until the voltage reached the pre-charging voltage of battery of 4.34V;
4) the battery was standed after the voltage reaching the pre-charging voltage of battery of 4.34V, and the rest time was 30 s, and then the battery was charged with constant current of 1.8 C until the voltage reaching a cut-off voltage of battery of 4.35V, and then the battery was charged with constant voltage until the current reaching the cut-off current of 0.05 C.

Example 6

The battery was the same as Example 1.
At 25° C., the battery was charged with the fast charging method of the present invention, according to the steps as follows:
1) the battery was charged with constant current of 3 C, and the charging time was 10 s;
2) the battery was charged with constant current of 0.1 C, and the charging time was 1 s;
3) the battery was discharged with constant current of 0.1 C, and the discharging time was 2 s, recycling until the voltage reached the pre-charging voltage of battery of 4.34V;
4) the battery was standed after the voltage reaching the pre-charging voltage of battery of 4.34V, and the rest time was 60 s, and then the battery was charged with constant current of 1 C until the voltage reaching a cut-off voltage of battery of 4.35V, and then the battery was charged with constant voltage until the current reaching the cut-off current of 0.05 C.

Example 7

The battery was the same as Example 1.
At 25° C., the battery was charged with the fast charging method of the present invention, according to the steps as follows:
1) the battery was charged with constant current of 3 C, and the charging time was 20 s;
2) the battery was charged with constant current of 0.05 C, and the charging time was 10 s;
3) the battery was discharged with constant current of 0.05 C, and the discharging time was 5 s, recycling until the voltage reached the pre-charging voltage of battery of 4.34V;
4) the battery was standed after the voltage reaching the pre-charging voltage of battery of 4.34V, and the rest time was 60 s, and then the battery was charged with constant current of 3 C until the voltage reaching a cut-off voltage of battery of 4.35V, and then the battery was charged with constant voltage until the current reaching the cut-off current of 0.01 C.

Comparative Example

The battery was the same as Example 1.
At 25° C., the battery was charged with conventional constant current/constant voltage charging method, according to the steps as follows (see FIG. 3): step 1) the battery was charged with constant current of 1.3 C; step 2) after the voltage reaching cut-off voltage of battery of 4.35V, the battery was charged with constant voltage until the current reaching the cut-off current of 0.05 C.

Testing Method and Process

The charging process was performed at Neware battery testing system (model: BTS-4008-W). The charging voltage and current of battery were real-time monitored with the time step of 1 s. After finishing the charging, charging SOC was calculated according to the formula of charging SOC=charging capacity/rated capacity. (The charging capacity was the product of current and time.)

Figure 4:
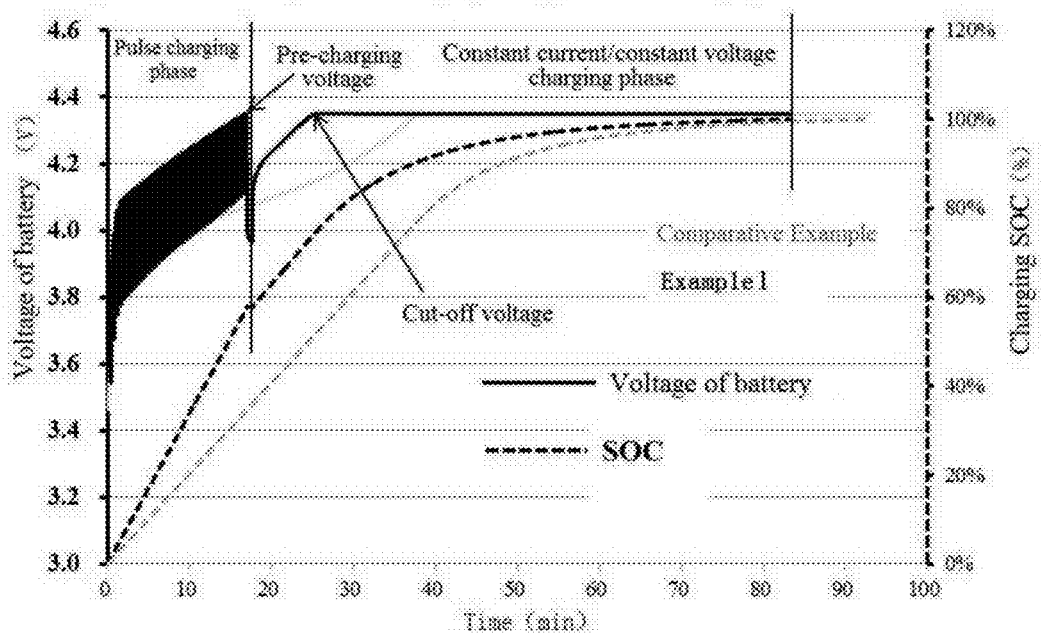
FIG. 4 is the graph of the charging voltage and the charging SOC changing with the time, in Example 1 and Comparative Example.

The testing results of Example 1 and Comparative Example were shown in FIG. 4, and the testing results of Examples from 1 to 7 and Comparative Example were shown in Table 1.

The graph of the charging voltage and the charging SOC changing with the time in Example 1 and Comparative Example was shown in FIG. 4. Wherein, the dark curve represented Example 1 (the black-filled part was caused by the leaping changes of voltage in pulse charging phase), and the light curve represented comparative Example; the solid line represented the charging voltage, and the dotted line represented the charging SOC. According to the curve of charging SOC in FIG. 4, it was observed that in pulse charging phase (early period of charging process, approximately 60% of SOC according to FIG. 4), the slope of charging SOC curve in Example 1 was distinctly greater than in Comparative Example. Comparing Example 1 with Comparative Example, in pulse charging phase the battery charging speed of Example 1 (early period of charging process, approximately 60% of SOC according to FIG. 4) was significantly improved.

TABLE 1

The change of charging SOC with the time of the batteries in Examples from 1 to 7 and Comparative Example.

| Time (s) | 50% SOC | 80% SOC | 100% SOC |
|---|---|---|---|
| Comparative Example | 1470 | 2364 | 5568 |
| Example 1 | 888 | 1698 | 4998 |
| Example 2 | 810 | 1608 | 4866 |
| Example 3 | 846 | 1650 | 4926 |
| Example 4 | 888 | 1698 | 4536 |
| Example 5 | 870 | 1572 | 4758 |
| Example 6 | 792 | 1626 | 4908 |
| Example 7 | 750 | 1542 | 4848 |

Table 1 listed the comparison of the times which were needed for the batteries charging to difference SOC in the Examples from 1 to 7 and Comparative Example. It was observed that using fast charging method for battery provided in the present invention, the charging speed in pulse charging phase (early period of charging process, approximately 80% of SOC according to Table 1) could be greatly improved, and thus the full-charging time could be shortened.

The invention claimed is:

1. A fast charging method for a battery, includes the steps as follows:
   (1) charging the battery with a constant current I1 during a time period t1;
   (2) charging the battery with a constant current I2 during a time period t2;
   (3) discharging the battery with the constant current I2 during a time period t3, and repeating steps (1)-(3) until reaching a pre-charging voltage;
   (4) suspending during a time period t4, and then charging the battery with a constant current I3 until reaching a cut-off voltage, and then charging the battery with a constant voltage until the current reaching a cut-off current I4;
   wherein, I2<I1, t2<t1, t3<t1, I2<I3≤I1, I4≤I2.

2. A fast charging method for battery according to claim 1, wherein, said fast charging method for the battery is performed at room temperature.

3. A fast charging method for battery according to claim 1, wherein,
   the current value of I1 is between 2.5 C and 3 C, and the charging time t1 is between 10 s and 30 s;
   the current value of I2 is between 0.02 C and 0.2 C, and the charging time t2 is between 1 s and 10 s;
   the current value ratio of I1/I2 is between 12.5 and 125, and the ratio of t1/t2 is between 2 and 10.

4. A fast charging method for battery according to claim 3, wherein, in the step (3), the discharging time t3 is between 1 s and 10 s, and the ratio of t1/t3 is between 3 and 10.

5. A fast charging method for battery according to claim 4, wherein, in the step (4), the rest time t4 is between 10 s and 60 s, and the current value of I3 is between 1 C and 3 C, and the current value of I4 is between 0.01 C and 0.1 C.

6. A fast charging method for battery according to claim 1, wherein, in the step (3), the pre-charging voltage is between V0 and Vk; wherein, V0 is the critical voltage value of battery, and Vk is the voltage setting value lower than the critical voltage value to avoid the liberation of lithium at the anode.

7. A fast charging method for battery according to claim 6, wherein, $4.2 \leq V0 < 4.5 V$;

$0 < Vk \leq 0.05 V$.

8. A fast charging method for battery according to claim 7, wherein, in the step (4), the cut-off voltage is V0.

9. A fast charging method for battery according to claim 8, wherein, the pre-charging voltage is 4.34V, and the cut-off voltage is 4.35V.

10. A fast charging method for battery according to claim 1, wherein, said battery is one of lithium-ion battery, lead-acid battery, nickel-hydrogen battery, or nickel-cadmium battery.

* * * * *